United States Patent
Logan et al.

(10) Patent No.: US 7,580,952 B2
(45) Date of Patent: Aug. 25, 2009

(54) AUTOMATIC DIGITAL IMAGE GROUPING USING CRITERIA BASED ON IMAGE METADATA AND SPATIAL INFORMATION

(75) Inventors: Ronald K. Logan, Everett, WA (US); Richard S. Szeliski, Bellevue, WA (US); Matthew T. Uyttendaele, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 408 days.

(21) Appl. No.: 11/069,662

(22) Filed: Feb. 28, 2005

(65) Prior Publication Data

US 2006/0195475 A1 Aug. 31, 2006

(51) Int. Cl.
*G06F 17/00* (2006.01)
(52) U.S. Cl. ............ 707/104.1; 707/100; 707/101; 707/10; 707/205; 707/102; 382/108; 382/254; 382/275; 382/100; 345/424; 345/419; 348/45; 348/65
(58) Field of Classification Search ............ 707/100, 707/101, 102, 10, 205, 104.1; 382/108, 100, 382/254, 275; 345/424, 419; 348/45, 65
See application file for complete search history.

(56) References Cited

U.S. PATENT DOCUMENTS

| | | | | |
|---|---|---|---|---|
| 6,144,375 | A * | 11/2000 | Jain et al. | 715/500.1 |
| 6,396,939 | B1 * | 5/2002 | Hu et al. | 382/128 |
| 6,564,263 | B1 * | 5/2003 | Bergman et al. | 709/231 |
| 7,043,473 | B1 * | 5/2006 | Rassool et al. | 707/6 |
| 7,298,869 | B1 * | 11/2007 | Abernathy | 382/108 |
| 2002/0140843 | A1 * | 10/2002 | Tretter et al. | 348/362 |
| 2003/0009469 | A1 * | 1/2003 | Platt et al. | 707/100 |

(Continued)

FOREIGN PATENT DOCUMENTS

EP 1324227 7/2003

OTHER PUBLICATIONS

Tinkwalder, A., Auto-bild bildverwaltung fast automatisch: Cumulus skripten und fit fuer exif machen, *CT Magazin Fuer Computer TEchnik, Heise Zeitschriften Verlag*, Hannover, DE, Sep. 8, 2003, No. 19, pp. 188-190.

(Continued)

*Primary Examiner*—Hosain T Alam
*Assistant Examiner*—Syling Yen
(74) *Attorney, Agent, or Firm*—Lyon & Harr, L.L.P.; Craig S. Fischer (57) ABSTRACT

An automatic digital image grouping system and method for automatically generating groupings of related images based on criteria that includes image metadata and spatial information. The system and method takes an unordered and unorganized set of digital images and organizes and groups related images into image subsets. The criteria for defining an image subset varies and can be customized depending on the needs of the user. Metadata (such as EXIF tags) already embedded inside the images is used to extract likely image subsets. This metadata may include the temporal proximity of images, focal length, color overlap, and geographical location. The first component of the automatic image grouping system and method is a subset image stage that analyzes the metadata and generates potential image subsets containing related images. The second component is an overlap detection stage, where potential image subset is analyzed and verified by examining pixels of the related images.

11 Claims, 7 Drawing Sheets

U.S. PATENT DOCUMENTS

| | | | |
|---|---|---|---|
| 2003/0072486 A1* | 4/2003 | Loui et al. | 382/175 |
| 2003/0128389 A1* | 7/2003 | Matraszek et al. | 358/1.18 |
| 2003/0174893 A1* | 9/2003 | Sun et al. | 382/232 |
| 2004/0037540 A1* | 2/2004 | Frohlich et al. | 386/96 |
| 2004/0201692 A1* | 10/2004 | Parulski et al. | 348/207.1 |
| 2004/0220965 A1* | 11/2004 | Harville et al. | 707/104.1 |

OTHER PUBLICATIONS

European Search Report, Application No. EP06110444.4, completed Apr. 24, 2006 received Apr. 28, 2006.

Agarwala, A., Dontcheva, M., Agrawala, M., Drucker, S., Colburn, A., Curless, B., Salesin, D., and Cohen, M., "Interactive digital photomontage" in *ACM Trans. Graph.*, 23(3):294-302, 2004.

Brown, M., and Lowe, D.G., "Recognising panoramas" in *Proceedings of the Ninth IEEE International Conference on Computer Vision*, pp. 1218-1225. IEEE Computer Society, 2003.

Cohen, M.F., Colburn, A, and Drucker, S., "Image Stacks", MSR-TR-2003-40, Jul. 2003.

Platt, J.C., "AutoAlbum: Clustering Digital Photographs Using Probabilistic Model Making", in *IEEE Workshop on Content-Based Access of Image and Video Libraries* 2000, pp. 96-100, (2000).

Schaffalitzky, F. and Zisserman, A., "Multi-view matching for unordered image sets, or 'How do I organize my holiday snaps?'", In Proc. ECCV, vol. 1, pp. 414-431, Springer-Verlag, 2002.

* cited by examiner

AUTOMATIC DIGITAL IMAGE GROUPING USING CRITERIA BASED ON IMAGE METADATA AND SPATIAL INFORMATION

TECHNICAL FIELD

The present invention relates in general to digital image processing and more particularly an automatic digital image grouping system and method for automatically determining related images in an image set using criteria that includes image metadata and spatial information.

BACKGROUND OF THE INVENTION

Digital cameras are image-capturing devices that are popular with consumers. Because digital cameras targeted for the consumer are so easy to use, a user will typically accumulate a large amount of digital images over time. These digital images, which are generally amassed on a hard drive or removable storage medium, often are stored in a folder that contains a large collection of unordered and unorganized images. This set of unordered images commonly is unwieldy and a user wishing to organize this set faces a daunting task.

Software does exist that automatically finds images that "go together" or are related. For instance, a user may want to find images that are related because they have the same exposure, track an object, form a group shot, or form a panorama. One type of existing software takes a collection of overlapping images and automatically stitches together a panorama. In addition, there is software currently available that takes a collection of images capturing the same scene at different exposures and produces a high-dynamic range image. For example, one such technique is described in co-pending application Ser. No. 11/049,597, filed on Feb. 1, 2005, by M. Uyttendaele, R. Szeliski, and A. Eden entitled "Method and System for Combining Multiple Exposure Images having Scene and Camera Motion" and in U.S. Ser. No. 10/623,033 by S. B. Kang, M. Uyttendaele, S. Winder, and R. Szeliski entitled "System and Process for Generating High Dynamic Range Images from Multiple Exposures of a Moving Scene" filed on Jul. 18, 2003. In addition, software exists that takes a collection similar images and creates a single composite image. This type of technique is described in a paper by A. Agarwala, M. Agarwala, S. Drucker, A. Colburn, B. Curless, D. Salesin, and M. Cohen, entitled "Interactive Digital Photomontage in *ACM Trans. Graph.,* 23(3):294-302, 2004.

In theory, it is possible to input every image contained in the set of unordered images to the techniques listed above. One problem with this, however, is that it is quite slow and inefficient. In other words, throwing each image of the set of unordered images to one of these image overlapping detection techniques is an inefficient way to use these general-purpose techniques.

There are other techniques that perform clustering of a set of unordered images. For example, two clustering techniques are described in a paper by F. Schaffalitzky and A. Zisserman entitled "Multi-View Matching for Unordered Image Sets, or 'How Do I Organize My Holiday Snaps?'" in Proceedings of the European Conference on Computer Vision, pp. 414-431, 2002 and in a paper by J. Platt entitled "AutoAlbum: Clustering Digital Photographs using Probabilistic Model Merging" by J. C. Platt in *Proc. IEEE Workshop on Content-Based Access of Image and Video Libraries* 2000, pp. 96-100, (2000).

One problem, however with the Schaffalitzky et al. technique is that is it purely image based. In particular, their technique looks for similarities in images by looking at features captured in the images, such as people, buildings, and so forth. Once enough similar features are found then the images are defined as related. Only image data is used in the clustering of images. The Platt technique groups images based on temporal analysis (such as time stamps) and color overlap. However, one problem with the Platt technique is that is does not perform any type of spatial analysis or pixel analysis.

Therefore, what is needed is an automatic digital image grouping system and method that provides a quick and efficient way of organizing a set of unordered images. What is also needed is a system and method that examines and analyzes a variety of criteria to provide customized grouping and collection generation of related images in the set of unordered images.

SUMMARY OF THE INVENTION

The invention disclosed herein includes an automatic digital image grouping system and method for automatically determining related images and image groupings. The automatic image grouping system and method takes an unordered and unorganized set of digital images and organizes and groups related images. Grouping related images prior to processing by general-purpose image processing software (such as image stitching applications and high-dynamic range applications) greatly increases efficiency and decreases processing time.

The automatic image grouping system and method finds related images using metadata associated with each image. Metadata is information about each image that can be accessed quickly without opening the image file. Moreover, the analysis of the metadata provides better grouping power than image-based techniques alone. Once potential groupings are identified, a thorough pixel analysis is performed to further confirm the relation between images and classify the types of relationship.

The automatic image grouping method includes inputting a set of unordered images that contain a collection of unorganized and unordered images, and analyzing the metadata associated with each image in the set to determine related images. The method further includes generating a potential image subset containing the related images. This is based on the results of the metadata analysis. Collection recognizers, which are criteria that determine which metadata to examine, are used in the metadata analysis. Collection recognizers include temporal proximity, focal length, geographical location, and color overlap using thumbnail images.

The potential image subset is then analyzed and verified by examining pixels of the related images. In a preferred embodiment, a pairwise technique is used to analyze and verify. The method also includes determining whether the potential image subset contains images that form a panorama or a true image stack. A true image stack are images that capture the same scene but have virtually no camera motion between images. On the other hand, panoramas have some images that have spatial overlap but cover different portions of the scene to provide the panorama. An image processing technique is selected to process verified image subsets based on whether the images are panoramas or true image stacks.

The automatic image grouping system includes modules for incorporating the automatic image grouping method described above. In particular, the automatic image grouping system includes a metadata analysis module that analyzes metadata associated with each image, a metadata relation module located in the metadata analysis module that determines which of the plurality of digital images is related based on collection recognizers, and a potential image subset that contains the related group of images. The system also includes a collection recognizer selection module that determines which collection recognizers to use by the metadata relation module. In addition, the system includes a verification module that analyzes and verifies the potential image subset using a pairwise technique. The system also includes user interfaces that present to a user which image groupings were used to form the potential image subset and which images were not used. Moreover, another user interface of the system informs the user whether the potential image subset contains images that form a panorama or a true image stack.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Digital camera users typically accumulate a great deal of digital images that are kept in an unordered and unorganized manner. Organizing these images or determining which images are related can be a complex and time-consuming task. There are many reasons that a user may want to determine which images are related, such as because they have the same exposure, track an object, form a group shot, or form a panorama. Software exists that can take images and automatically stitches them together to form a panorama, or take a collection of images capturing the same scene at different exposures and produces a high-dynamic range image. However, taking an unordered and unorganized collection of images and inputting it into one of these software application can be quite slow and inefficient.

The automatic image grouping system and method disclosed herein analyzes the unordered collection of images and determine which ones are related and go together to form image subsets. These image subsets may be based on, for example, panoramas, multiple exposures, repeated shots of the same scene. The criteria for defining an image subset can vary and can be customized depending on the needs of the user.

Panoramas are views created by stitching together different photographic images. Images that may be used for creating a panorama are often buried in a larger collection of photographs. The automatic image grouping system and method provides panorama discovery in which images in the unordered image set are examined and automatically combine into panoramas. Metadata (such as EXIF tags) already embedded inside the images is used to extract likely panorama sets for further processing by the image stitching algorithm. This metadata may include the date and time the pictures were taken and their focal lengths as indicators of potential panorama groupings.

The first component of the automatic image grouping system and method is a subset image stage that arranges images of the unordered image set into image subsets. These image subsets then are input into a second component, an overlap detection stage. This is an extant technique that detects overlaps. However, as stated above, these techniques are quite slow and it is inefficient to simply input every image in the input image set to the technique. Thus, to increase efficiency, the novel automatic image grouping system and method intelligently selects images from an image set and only inputs subsets of images to the overlap detection component.

II. General Overview

Figure 1:
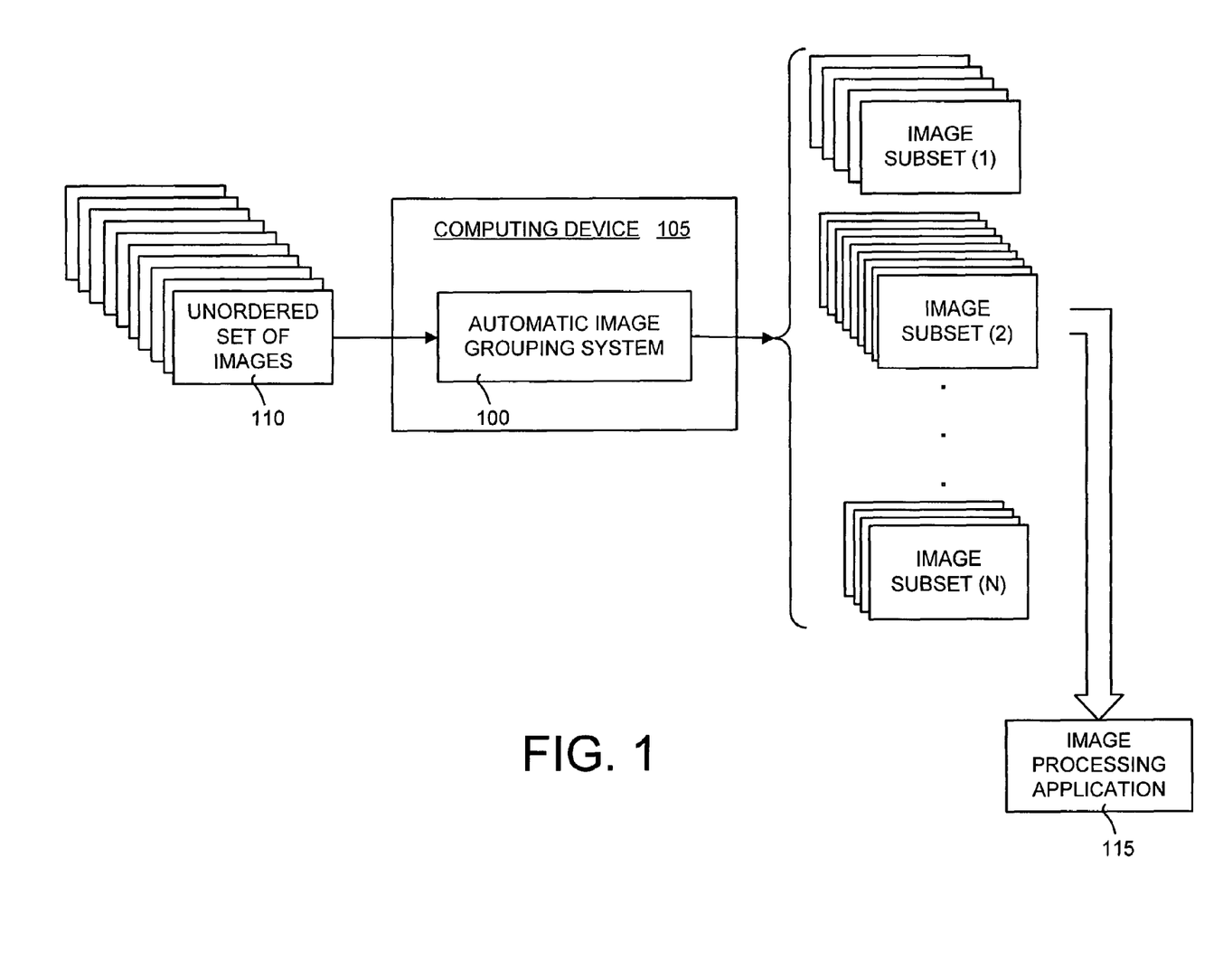
FIG. 1 is a block diagram illustrating an exemplary implementation of a automatic image grouping system and method disclosed herein.

FIG. 1 is a block diagram illustrating an exemplary implementation of a automatic image grouping system and method disclosed herein. Referring to FIG. 1, an automatic image grouping system 100 is located on a computing device 105. In general, the automatic image grouping system 100 processes an unordered set of images 110 to generated groupings of related images.

More specifically, as shown in FIG. 1, the unordered set of images 110 contains a plurality of images that are unorganized and varied. For example, the unordered set of images 110 may be a folder containing both digital images and a tree of directories containing more digital images. This image set 110 is input to the automatic image grouping system 100 residing on the computing device 105.

As explained in detail below, the automatic image grouping system 100 processes the unordered image set 110 analyzing metadata or information associated or embedded in each image to extract likely groupings. These grouping are subsets of the unordered image set 110 that are related. having related cues or collection recognizers. As shown in FIG. 1, the image subsets include image subset (1), image subset (2), up to image subset (N), such that there are N number of image subsets. Each of these image subsets represent a grouping of related images.

Once the unordered image set 110 has been processed and image subsets extracted, the image subsets may be processed by an image processing application 115. For example, the image processing application 115 may take an image subset containing spatially overlapping images and automatically stitch together a panorama. Or, the image processing application 115 may input an image subset of images that capture the same scene at different exposures and generate a high-dynamic range image. Alternatively, the image processing application 115 may use a variety of other types of image processing techniques.

One advantage of the automatic image grouping system 100 is that it reduces and focuses the input to the image processing application 115 such that the image processing application 115 processing is quicker and more efficient. For example, instead of inputting the entire unordered image set 110, after processing by the automatic image grouping system 100 only a smaller and more focused image subset is input, thereby reducing processing time and increasing efficiency.

III. Exemplary Operating Environment

The automatic image grouping system and method disclosed herein are designed to operate in a computing environment and on a computing device, such as the computing device 105 shown in FIG. 1. The computing environment in which the automatic image grouping system and method disclosed herein operate will now be discussed. The following discussion is intended to provide a brief, general description of a suitable computing environment in which the automatic image grouping system and method may be implemented.

Figure 2:
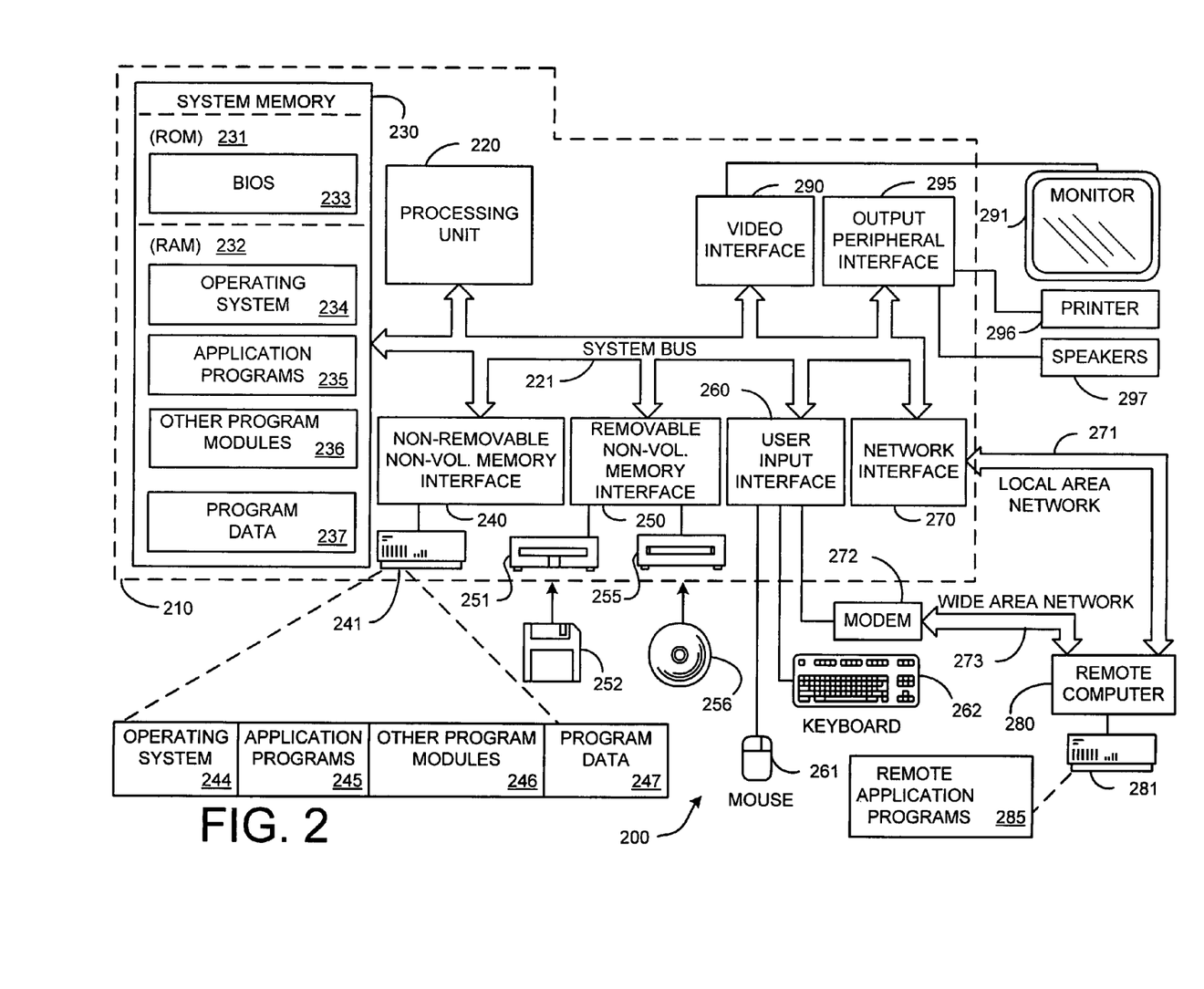
FIG. 2 illustrates an example of a suitable computing system environment in which the automatic image grouping system and method shown in FIG. 1 may be implemented.

FIG. 2 illustrates an example of a suitable computing system environment in which the automatic image grouping system and method shown in FIG. 1 may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The automatic image grouping system and method is operational with numerous other general purpose or special purpose computing system environments or configurations. Examples of well known computing systems, environments, and/or configurations that may be suitable for use with the automatic image grouping system and method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The automatic image grouping system and method may be described in the general context of computer-executable instructions, such as program modules, being executed by a computer. Generally, program modules include routines, programs, objects, components, data structures, etc., that perform particular tasks or implement particular abstract data types. The automatic image grouping system and method may also be practiced in distributed computing environments where tasks are performed by remote processing devices that are linked through a communications network. In a distributed computing environment, program modules may be located in both local and remote computer storage media including memory storage devices. With reference to FIG. 2, an exemplary system for implementing the automatic image grouping system and method includes a general-purpose computing device in the form of a computer 210. The computer 210 is an example of the computing device 105 shown in FIG. 1.

Components of the computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 210 typically includes a variety of computer readable media. Computer readable media can be any available media that can be accessed by the computer 210 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 210. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within the computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 220 through a user input interface 260 that is coupled to the system bus 221, but may be connected by other interface and bus structures, such as, for example, a parallel port, game port or a universal serial bus (USB). A monitor 291 or other type of display device is also connected to the system bus 221 via an interface, such as a video interface 290. In addition to the monitor 291, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

IV. System Components

Figure 3:
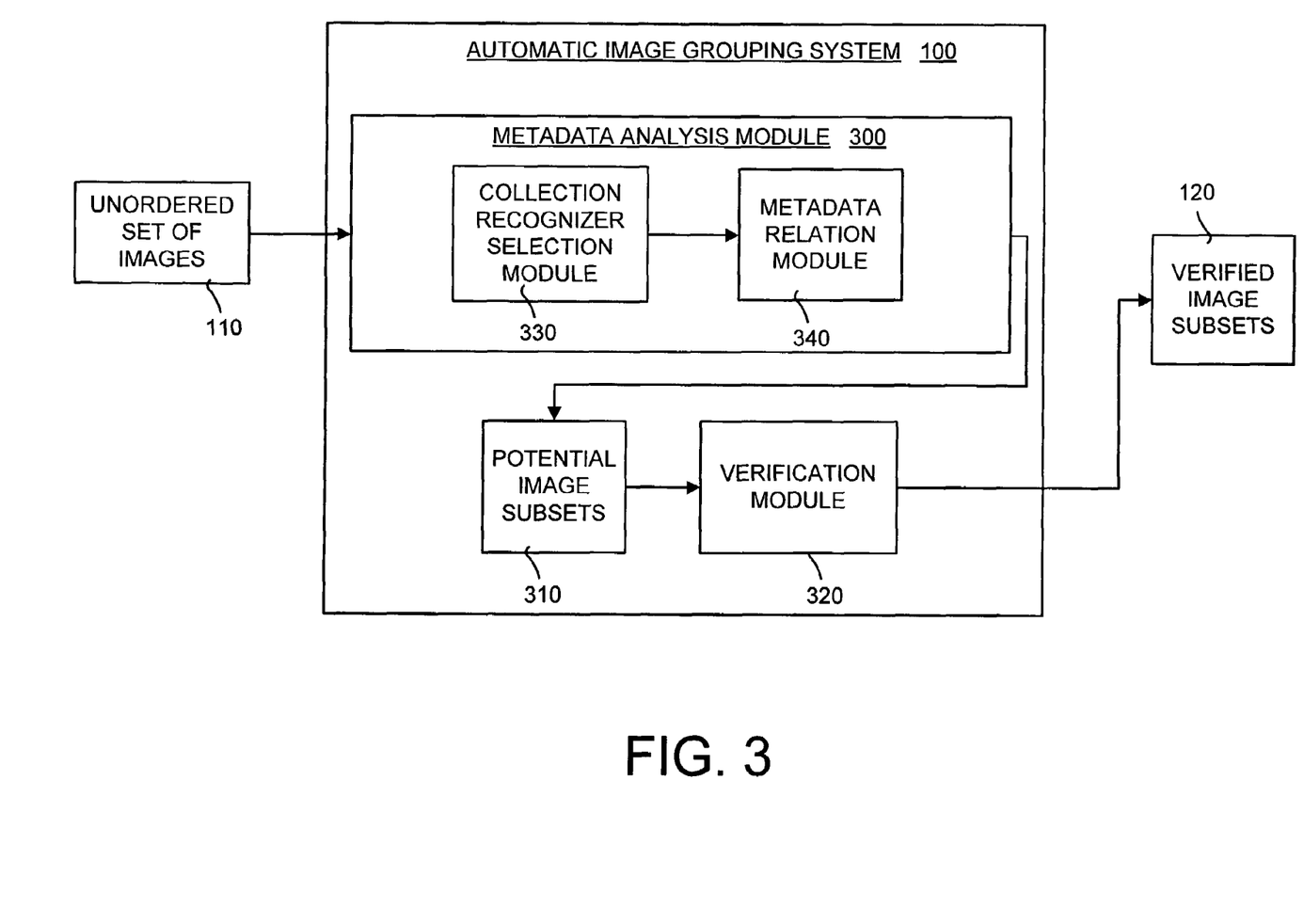
FIG. 3 is a general block diagram illustrating components of the automatic image grouping system shown in FIG. 1.

FIG. 3 is a general block diagram illustrating components of the automatic image grouping system 100 shown in FIG. 1. The automatic image grouping system 100 inputs the unordered set of images 110, processes each image in the set 110, and outputs verified image subsets 120. The verified images subsets 120 contain groupings of images from the unordered image set 110 that are related. As explained in detail below, these relationships are based on certain criteria or collection recognizers.

The automatic image grouping system 100 includes a number of modules that perform processing on the unordered image set 110. In particular, the automatic image grouping system 100 includes a metadata analysis module 300, which analyzes metadata corresponding to each image in the unordered image set 110, potential image subsets 310, which are generated by the metadata analysis, and a verification module 320, which verifies the grouping of the potential image subsets and output the verified image subsets 120.

The metadata analysis module 300 includes a collection recognizer selection module 330, and a metadata relation module 340. The collection recognizer selection module 330 determines the cues or collection recognizers that will be used in the metadata analysis. These collection recognizers are criteria that are used to group the unordered set of images 110. The metadata relation module 340 inputs the collection recognizers and uses them to analyze each image. Based on this analysis, the metadata relation module 340 finds groups of image that are related.

The output of the metadata analysis module 330 is the potential image subsets 310. These are input to the verification module 320, which performs a thorough pixel analysis to determine the type and amount of overlap between images. The output from the verification module 320 are the verified image subsets 120.

V. Operational Overview

Figure 4:
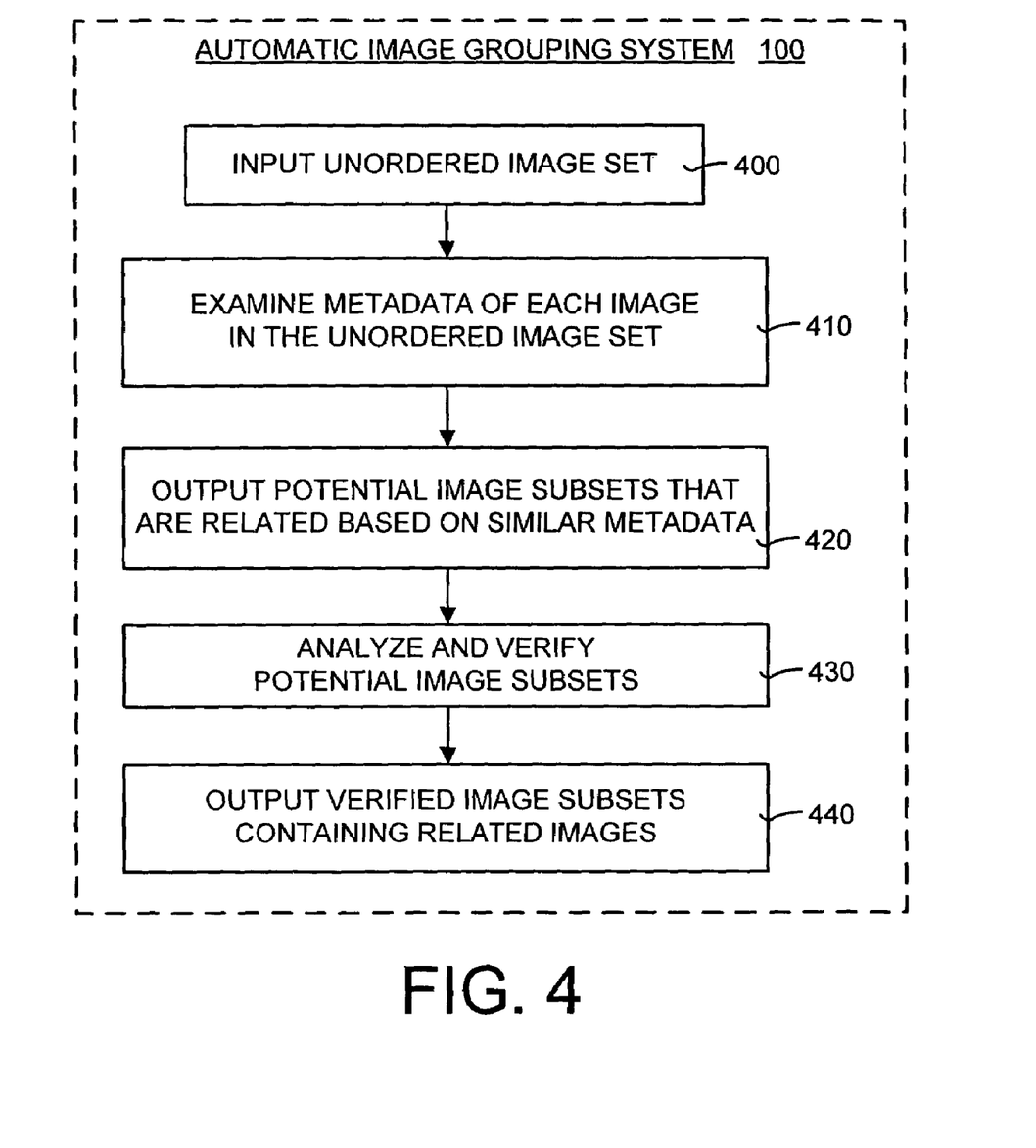
FIG. 4 is a general flow diagram illustrating the general operation of the automatic image grouping system and method shown in FIGS. 1 and 3.

The operation of the automatic image grouping system 100 and method used therein as shown in FIGS. 1 and 3 now will be discussed. FIG. 4 is a general flow diagram illustrating the general operation of the automatic image grouping system 100 and method shown in FIGS. 1 and 3. The method begins by inputting the unordered image set (box 400). The unordered image set contains a plurality of images that are unorganized and have no particular order or grouping. Next, the method examines metadata associated with each image in the unordered image set (box 410). Typically, this metadata is embedded in each image and can be read without opening the image file.

The method then creates groups of related images and outputs potential images subsets (box 420). These potential image subsets contain at least a portion of the images in the unordered image set. The potential image subsets are created based on the images in the group having similar metadata. Next, the potential image subsets are analyzed and verified to further classify the groupings (box 430). Finally, verified image subsets containing related images are output (box 440).

VI. Operational Details

Figure 5:
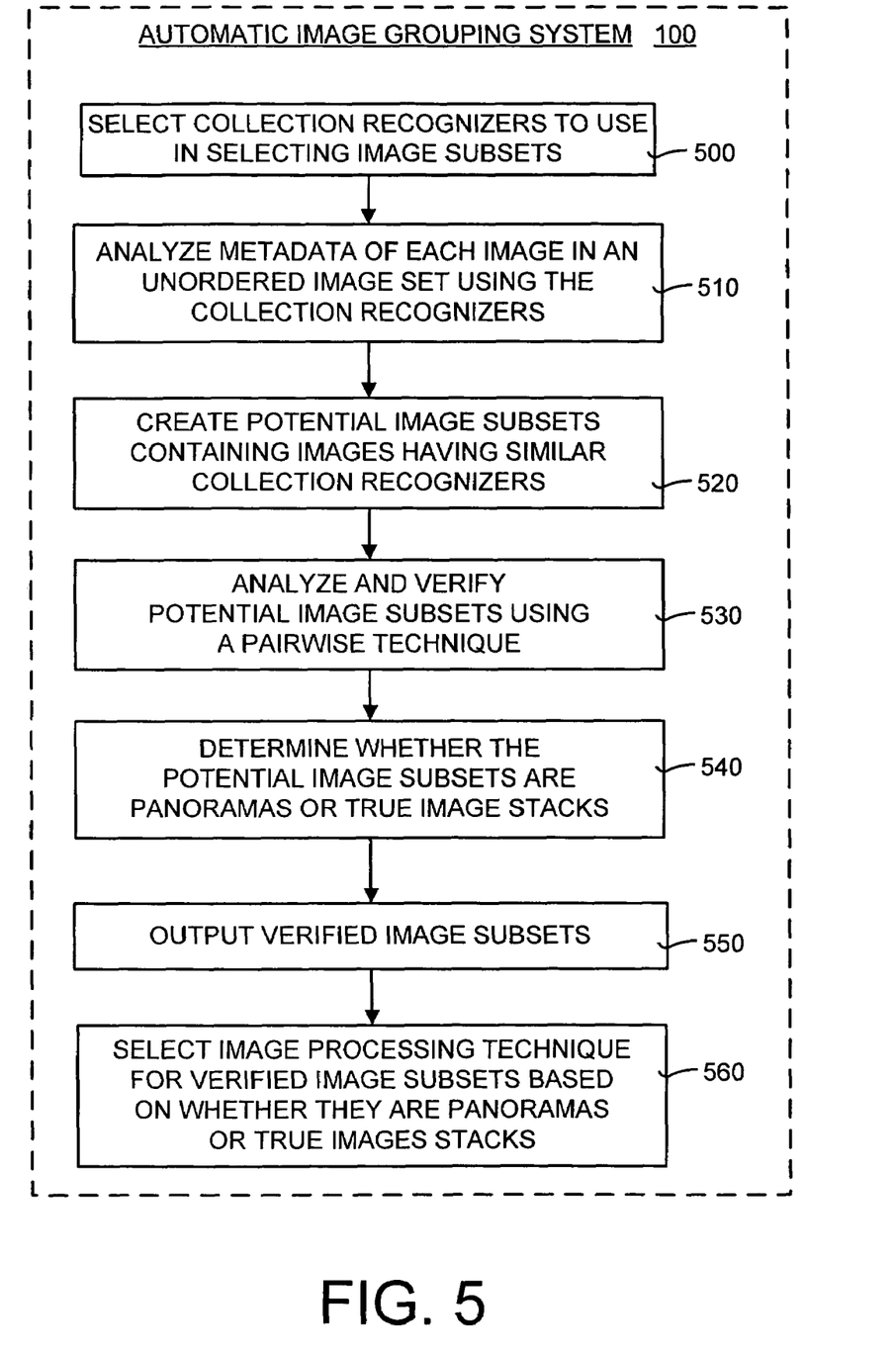
FIG. 5 is a flow diagram illustrating the further details of the automatic image grouping method shown in FIG. 4.

The operational details of the automatic image grouping system 100 and method of FIGS. 1, 3 and 4 will now be discussed. FIG. 5 is a flow diagram illustrating the further details of the automatic image grouping method shown in FIG. 4. Specifically, one or more cues or collection recognizers are selected for use in determining image groupings or subsets (box 500). Collection recognizers are criteria that are used to determine whether images are related.

One possible collection recognizer includes temporal proximity, meaning that images were taken relatively close in time. This ignores images of the same scene that were taken at very different times, such as a few hours or days apart. Another potential collection recognizer includes focal length. Thus, images having similar focal length are seen as related. Although there may be cases where a wide-angle shot of a person is taken and then the face is zoomed in on for a close-up, this tends to be a less common case. The case that is most typical is where the focal length (or zoom) on the camera is not changed. Another possible collection recognizer is geographical location. Thus, images taken at a similar geographic location are deemed related. Certain cameras have geographical location metadata that indicates a location using GPS, which tells you where you are on the earth, and a compass bearing, which indicates in which direction the picture was taken. Thumbnails images are another potential cue. Thumbnail images can be used to examine similarity based on color. Thumbnail images may be inside an image file or may be computed by an outside application (such as Microsoft Windows®).

These collection recognizers can be used to generate the image subsets. The collection recognizers are a set of criteria that can be used selectively. They can be mixed and matched and used to develop different and customized collection recognizers to generate different subsets of related images. Collection recognizers recognize the existence of collections of related images. Depending on which collections recognizers (or cues) are used, the collections of related images will be different and can be customized.

Next, the metadata associated with each image from an unordered image set is analyzed using the collection recognizers (box 510). The images can be input by a directory specified by the user or the unordered image set may be downloaded. Before the images are opened to read the pixels, the automatic image grouping method examines the metadata of the images. In general, modern digital cameras store image processing values with each image as an exchangeable image file (EXIF). EXIF is the most widely used standard for encoding information or metadata about images, such as temporal information, shutter speed, aperture size, and ISO. An EXIF tag containing this information is attached to each image. The metadata contained in the EXIF associated with an image can be read without actually opening the image.

Potential image subsets then are created (box 520). These potential image subsets contain groupings of image that have similar collection recognizers. The next portion of the method is an overlap detection stage. After the potential image subsets are generated, then a pairwise technique is used to analyze and verify the potential image subsets (box 530). The pairwise technique looks for overlapping relationships between images in a robust manner. For example, any movement between images (such as people moving around) is compensated for using the pairwise technique.

Several different types of pairwise techniques may be used to analyze and verify the potential image subsets. For example, one technique that may used is described in a paper by M. Brown and D. G. Lowe, entitled "Recognizing Panoramas" in *Proceedings of the Ninth IEEE International Conference on Computer Vision*, pp. 1218-1225. IEEE Computer Society, 2003. Brown and Lowe describe a technique that can be used to verify whether images in a potential image subset actually overlap. The technique examines the images and performs a pairwise comparison based on features to determine how the images overlap. From the pairwise overlap, panoramas are generated.

An alternative to the Brown and Lowe technique is a technique described in a co-pending patent application U.S. Ser. No. 10/833,760 entitled "Multi-Image Feature Matching Using Multi-Scale Oriented Patches" by Richard Szeliski and Matthew Brown filed on Apr. 27, 2004. This technique is also called the Multi-Scale Oriented Patches (MOPS) technique. Yet another alternative is the technique described the F. Schaffalitzky and A. Zisserman cited above. The Schaffalitzky and Zisserman technique uses features to determine overlap between images. The Schaffalitzky and Zisserman technique may be used to find collections of images that have overlap but are taken from not the exact location (i.e. taken from a different point of view).

A potential image subset is also known as an "image stack". The term is found in a paper by M. Cohen, A. Colburn, and S. Drucker entitled "Image Stacks" in Microsoft Research Technical Report No. MSR-TR-2003-40. Image stacks are a collection of images that are related (or that have spatial overlap) such that if you put them together they have some meaning. The verification process may split one potential image subset (or image stack) into several stacks. Or, the verification process may reject the image stack altogether. The verification process actually opens the image files and performs a fine-tooth analysis of pixel appearance to determine whether there are true overlaps and, if so, the type of overlap.

Next, a determination is made as to whether the potential image subsets are panorama or "true" image stacks (box 540). The term "true image stack" is used to define an image stack where there is very little camera motion. This means that the image stack was captured by taking multiple exposures, or was a repeated group shot. On the other hand, the panorama occurs when there is a significant amount of motion, because the photographer is attempting to capture a larger spatial domain.

The pairwise technique outputs one or more verified image subsets (box 550). In a preferred embodiment, the method outputs the largest of the verified image subsets and notifies the user which potential image subsets were not used. In an alternate embodiment, initial groupings suggested by different collection recognizers (such as time proximity and focal length) can be separated and the user then is notified of which groupings are not being used.

The automatic image grouping method distinguishes between panoramas and true stacks, because a user typically wants to process them differently. Thus, the automatic image grouping method includes selecting an image processing technique for verified image subsets based on whether they are panoramas or true image stacks (box 560). If a verified image subset is a panorama, any one of several available image stitching techniques can be used to stitch the images together and create a panorama. If the verified image subset is a true stack, then depending on the type of stack, the subset may be processed using a best picture selection technique or an image merging technique. If the verified image subset is a multiple exposure stack, it may be processed using a high-dynamic range technique, described in co-pending patent application U.S. Ser. No. 10/623,033 cited above. If the verified image subset has similar exposure, then it may be processed using the technique described in the Agarwala et al. paper cited above.

Figure 6:
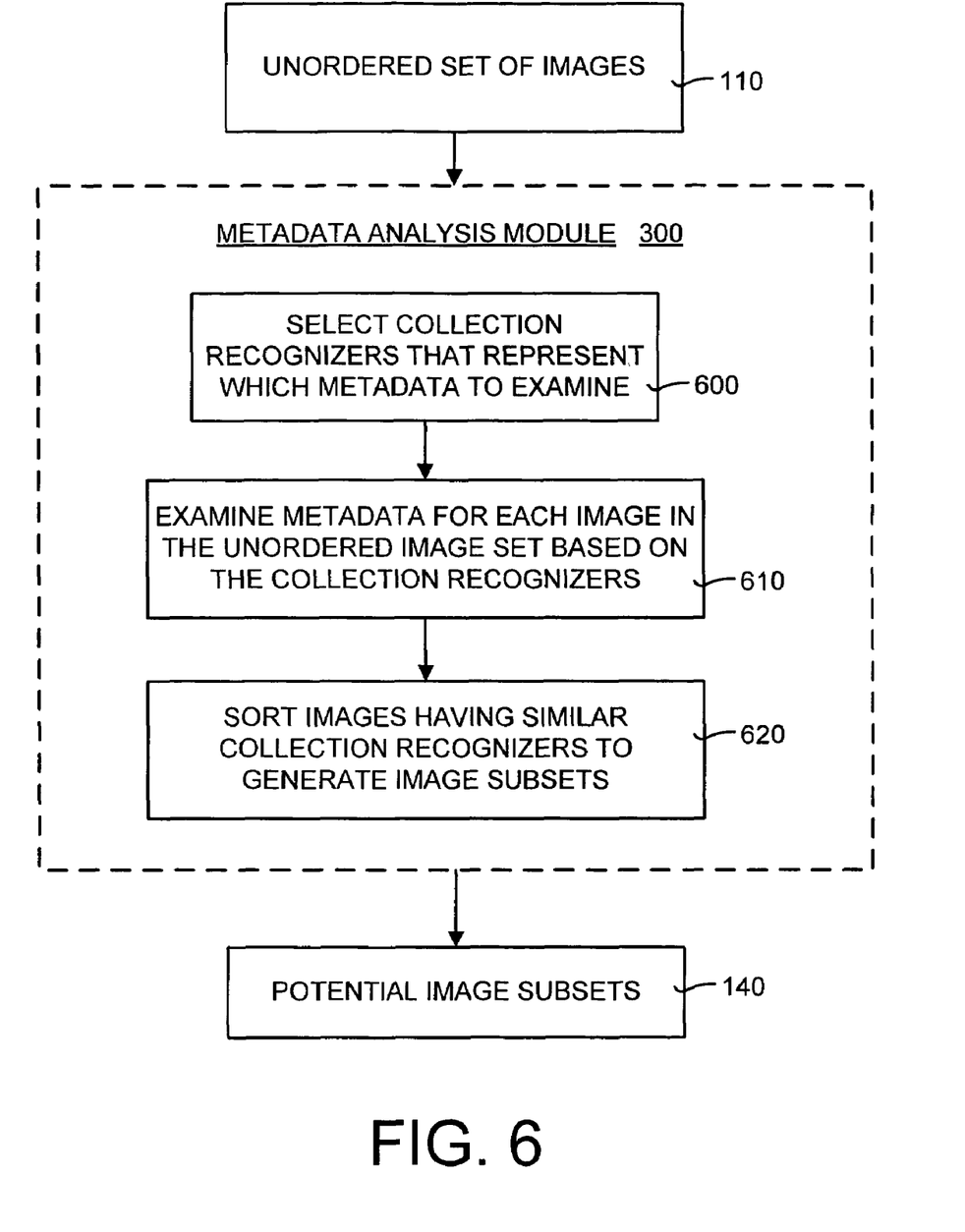
FIG. 6 is a detailed flow diagram illustrating the operation of the metadata analysis module shown in FIG. 3.

FIG. 6 is a detailed flow diagram illustrating the operation of the metadata analysis module 300 shown in FIG. 3. In particular, the unordered set of images 110 is input to the metadata analysis module 300. Typically, the image file is not opened by the module 300, but instead the metadata associated with the image file is examined. First, however, collection recognizers are selected that represent the metadata to examine (box 600). This metadata may be selected automatically by the automatic image grouping method or by a user. Next, the metadata corresponding to the selected collection recognizers is examined for each image in the unordered image set (box 610). The images are sorted based on whether they have similar collection recognizers (box 620). Image subsets containing these image groupings then are generated. These potential image subsets 140 are output for further processing as outlined above.

In order to more fully understand the automatic image grouping system 100 and method disclosed herein, the operational details of an exemplary working example are presented. It should be noted that this working example is only one way in which the automatic image grouping system and method may be implemented.

In this working example, the goal was to be able to point to a folder or folder tree and have the automatic image grouping system and method examine all the images and automatically combine related photos into panoramas. It would be a slow and an inefficient solution to throw all the digital photos at an image stitching algorithm at one time. The automatic image grouping system and method increases speed and efficiency by examining the metadata already embedded inside the images to extract likely panorama sets for further processing by the more expensive image stitching algorithm. This allows quick and automatic recognition and creation of panoramas from an arbitrary set of digital photos.

The automatic image grouping system and method can be used in a Windows® shell or Digital Image Suite library to facilitate panorama discovery at the folder-view level. It can also become a part of the image capture story, automatically detecting panoramas as the user is downloading his digital images from the device to the desktop.

In this working example, the process began with the specification of a directory or folder. This folder contained both digital images and a tree of directories containing more digital images. The automatic image grouping system and method took each folder as the first level unit. Digital images in a single folder had their metadata values extracted (as EXIF tags) and the images were sorted by the date and time they were originally taken (ExifDtOrig element). Pairwise comparisons of the times for adjacent photos were made, and "file sets" were created containing images that were taken relatively close together in time. Various existing sets of actual panorama images were examined, and a working cutoff value was decided upon. In this working example, the cutoff value was implemented as thirty (30) seconds.

Figure 7:
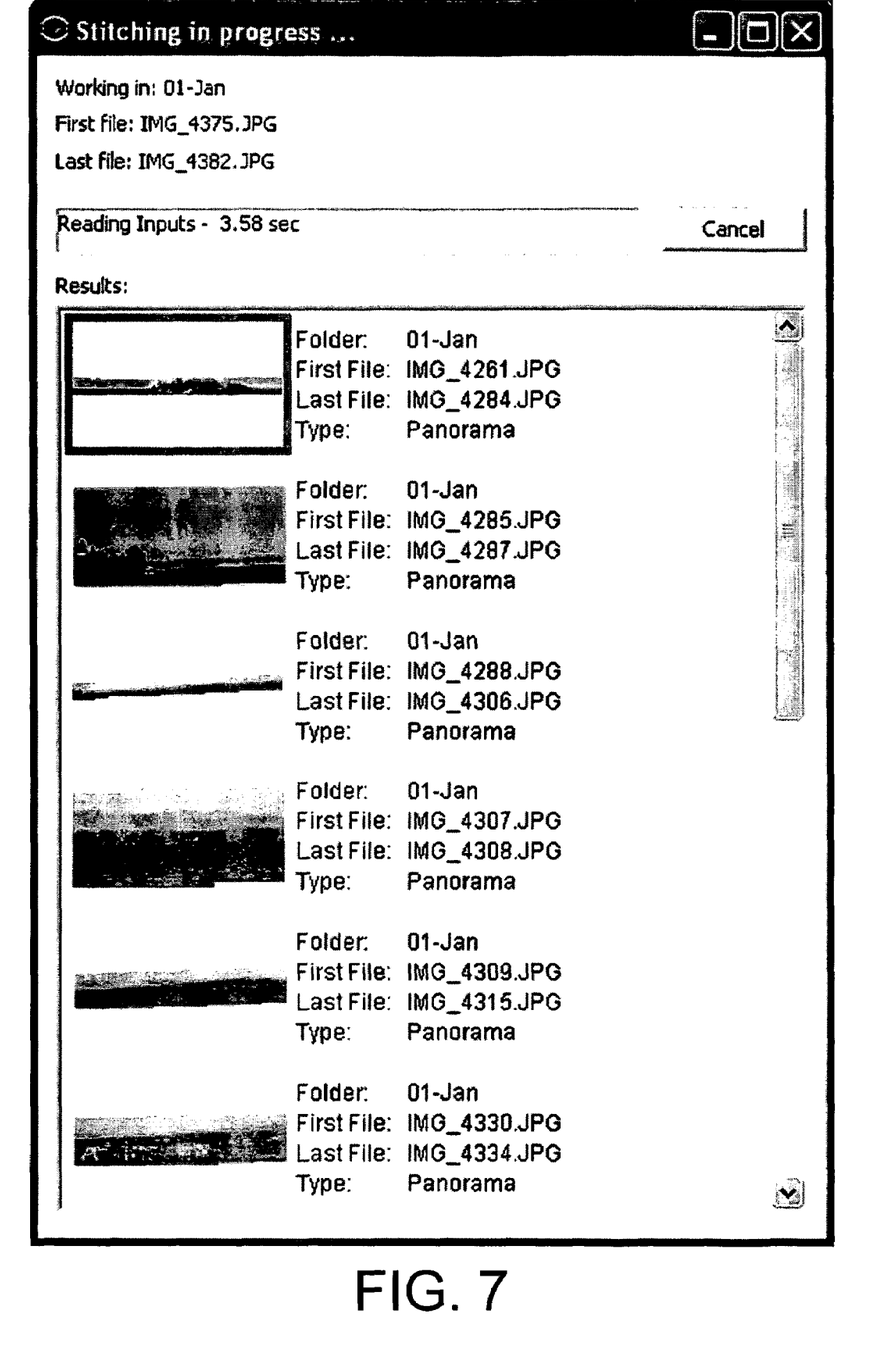
FIG. 7 illustrates a user interface used in an exemplary working example to notify a user that the automatic image grouping system and method are performing image stitching.

Other cues for grouping could have been used. For example, focal length (ExifFocalLength) comparisons were also implemented, breaking closely-timed photo groups even further if the focal length between adjacent images changed significantly (currently implemented as a 5% change). The resulting file sets created by the metadata comparisons were deemed "possible panoramas" and were handed off to the image stitching algorithm sequentially. The stitching algorithm returned the longest single panorama it found within a given file set. It is possible for multiple panoramas to exist within a given file set, so if the image stitching algorithm returned a panorama, the image set was reexamined for unused photos both before and after the found panorama images. If multiple images did exist at either end, they were placed in their own separate file set and re-run through the image stitching algorithm in order to discover any further panoramas. FIG. 7 illustrates a user interface used in an exemplary working example to notify a user that the automatic image grouping system and method are performing image stitching.

The stitched image algorithm not only detected true panoramas, but also image stacks, which were multiple images of the same subject. For instance, the images might be bracketed for exposure. These results were also useful for creating high dynamic range images and other digital effects such as continuous action "movie clips". The automatic image grouping system and method detected those sets of photos as well as true panoramas. It could tell the difference between the two by examining how much of the resulting panorama is covered by each compositing image. If the images all took up a large portion of the result, they together create an image stack. If they each took up small portions of the whole, the result was a true panorama.

In this working example, the automatic image grouping system and method created thumbnails for found panoramas and displays them in a list view so that a user could choose which ones they want to crop and save to their hard drives. The automatic image grouping system and method also persisted the panorama discovery results to a database-like file that can later be queried by users and accessed to process final images without having to re-run the automatic image grouping system and method.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A computer-implemented method for automatically grouping related images, comprising:

using a general-purpose computing device to perform the following method:

inputting a set of unordered images containing a collection of unordered and unorganized images;

analyzing metadata associated with each image in the unordered image set to determine the related images;

generating a potential image subset containing the related images based on results of the metadata analysis;

analyzing and verifying the potential image subset by opening each image of the potential image subset and examining each pixel of each image to determine a type of spatial relationship between the pixels and an amount of spatial overlap of pixels in images of the potential image subset; and automatically determining whether the potential image subset is a panorama, which contains a significant amount of motion between images, has spatial overlap, and contains images that cover different portions of a scene;

if the potential image subset is a panorama, then grouping the images in the potential image subset that are panoramas for processing by a first image processing technique comprising: an image stitching technique that is used to stitch the images in the potential image subset together and create a panorama;

automatically determining whether the potential image subset is a true image stack, which contains images having spatial overlap and capturing the same scene but has little or no camera motion between images;

if the potential image subset is a true image stack, then grouping the images in the potential image subset that are true image stacks for processing by a second image processing technique comprising: (a) a best picture selection technique or an image merging technique, if the potential image subset is a true stack; (b) a high-dynamic range technique, if the potential image subset is a multiple exposure stack; (c) a photomontage technique that takes a collection similar images and creates a single composite image, if images of the potential image subset have similar exposure.

2. The method of claim 1, further comprising using a pairwise technique to analyze and verify the potential image subset.

3. The method of claim 1, further comprising selecting an image processing technique to process the potential image subset based on whether the potential image subset is a panoramas or a true image stack.

4. The method of claim 1, further comprising selecting at least one collection recognizer as criteria for generating the potential image subset.

5. The method of claim 4, wherein the collection recognizer is at least one of: (a) similar temporal proximity; (b) similar focal length; (c) similar geographical location; (d) thumbnail images.

6. The method of claim 1, wherein analyzing metadata associated with each image further comprises obtaining the metadata in an exchangeable image file (EXIF) associated with each image without opening the image.

7. A computer-implemented process for automatically examining pixels and metadata associated with each image in an unordered image set to determine which images are related, comprising using a computer to perform the following:

a first selection step for selecting collection recognizers that are criteria for which metadata to examine, the collection recognizers including temporal proximity and focal length;

a metadata analysis step for analyzing the metadata of each image in the unordered image set based on the collection recognizers;

an image grouping step for grouping each image based on similar collection recognizers to generate potential image subsets containing groupings of related images;

a verification step for analyzing and verifying the potential image subsets using a pairwise technique that opens each image of the potential image subsets and performs a pixel analysis of pixels in each image to determine a type of spatial relationship between the pixels and an amount of spatial overlap of the pixels in images of the potential image subsets to generate verified image subsets;

a first determination step for automatically determining whether the images of the verified image subsets are panoramas, which contain images that have a significant amount of motion between image and have spatial overlap but that cover different portions of a scene;

if the images of the verified image subsets are panoramas, then a second selection step for selecting a first image processing technique comprising: an image stitching technique that is used to stitch the images of the verified image subsets together and create a panorama;

a second determination step for automatically determining whether the images of the verified image subsets are true image stacks, which contain images that have spatial overlap and that capture the same scene but have virtually no camera motion between images;

if the images of the verified image subsets are true image stacks, then a third selection step for selecting a second image processing technique comprising: (a) a best picture selection technique or an image merging technique, if the images of the verified image subsets are a true stack; (b) a high-dynamic range technique, if the images of the verified image subsets are a multiple exposure stack; (c) a photomontage technique that takes a collection similar images and creates a single composite image, if images of the images of the verified image subsets have similar exposure; and an image processing step for processing the verified image subsets using the selected image processing technique.

8. The computer-implemented process as set forth in claim 7, wherein the collection recognizers include at least one of: (a) color overlap using thumbnail images; (b) geographical location, including the location on earth of where an image was captured and a direction that the image is facing.

9. The computer-implemented process as set forth in claim 7, further comprising analyzing the metadata of each image without opening the image to examine its pixels.

10. An automatic image grouping system for discovering a related group of images, comprising:

a general purpose computing device;

a computer program comprising program modules executable by the computing device, the computer program further comprising:

an unordered image set containing a plurality of unorganized digital images;

a metadata analysis module that analyzes metadata associated with each of the plurality of digital images;

a metadata relation module located on the metadata analysis module that determines which of the plurality of digital images is related based on collection recognizers, the collection recognizers being criteria that dictates which metadata to analyze;

a potential image subset that contains the related group of images;

a verification module that analyzes and verifies the potential image subset using a pairwise technique by opening each image of the potential image subset and examining each pixel of each image to determine a type of spatial relationship between the pixels and an amount of spatial overlap of pixels in images of the potential image subset, and automatically determining whether: (a) the potential image subset is a panorama that contains a significant amount of motion between images and spatial overlap and having images that cover different portions of a scene to provide the panorama, and using a first imaging processing technique to process the potential image subset; or (b) a true image stack that contains images having spatial overlap and capturing the same scene but have little or no camera motion between images, and using a second image processing technique to process the potential image subset;

a first user interface displayed on a display device for presenting to a user of the system which image groupings were used to form the potential image subset and which images were not used;

a second user interface displayed on the display device for informing the user whether the potential image subset contains images that form a panorama or a true image stack;

the first image processing technique that is used to process the image groupings if the potential image subset is a panorama, where the first image processing technique is a technique comprising: an image stitching technique that is used to stitch the images in the potential image subset together and create a panorama; and the second image processing technique that is used to process the image groupings if the potential image subset is a true image stack, where the second image processing technique is a technique comprising: (a) a best picture selection technique or an image merging technique, if the potential image subset is a true stack; (b) a high-dynamic range technique, if the potential image subset is a multiple exposure stack; (c) a photomontage technique that takes a collection similar images and creates a single composite image, if images of the potential image subset have similar exposure.

11. The automatic image grouping system of claim 10, further comprising a collection recognizer selection module that determines which collection recognizers to use by the metadata relation module.

* * * * *